Feb. 14, 1939.  L. W. CHILTON  2,147,524
AUTOMOBILE TRANSMISSION
Filed March 7, 1938  2 Sheets-Sheet 1

Lawrence W. Chilton,
INVENTOR
BY Victor J. Evans & Co.
ATTORNEYS

P. F. Hickey,
WITNESS

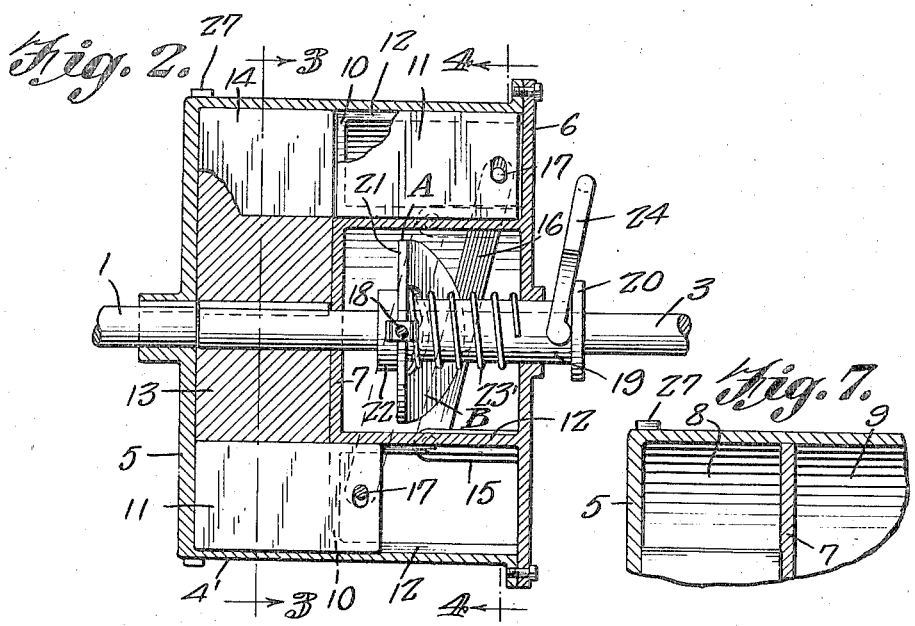

Patented Feb. 14, 1939

2,147,524

UNITED STATES PATENT OFFICE 2,147,524

AUTOMOBILE TRANSMISSION

Lawrence Wesley Chilton, Indianapolis, Ind.

Application March 7, 1938, Serial No. 194,465

4 Claims. (Cl. 192—59)

This invention relates to hydraulic transmissions for automobiles and other devices and has for the primary object the provision of a device of this character which besides proving variable speeds between the drive shaft and the driven shaft also acts as a clutch, whereby the shafts may be disconnected whenever desired and provides a fly wheel for the motive power for an engine, the device including a construction which will be durable, efficient and easy to operate and may be manufactured and sold at a low cost.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 2 is a view similar to Figure 1 showing the transmission in operative position establishing a direct drive between the drive and driven shafts.

Figure 3 is a transverse sectional view taken on line 3—3 of Figure 2.

Figure 4 is a transverse sectional view taken on line 4—4 of Figure 2.

Figure 7 is a fragmentary vertical sectional view showing the cylinder of the device divided into a main and auxiliary compartments by a partition.

Figure 1:
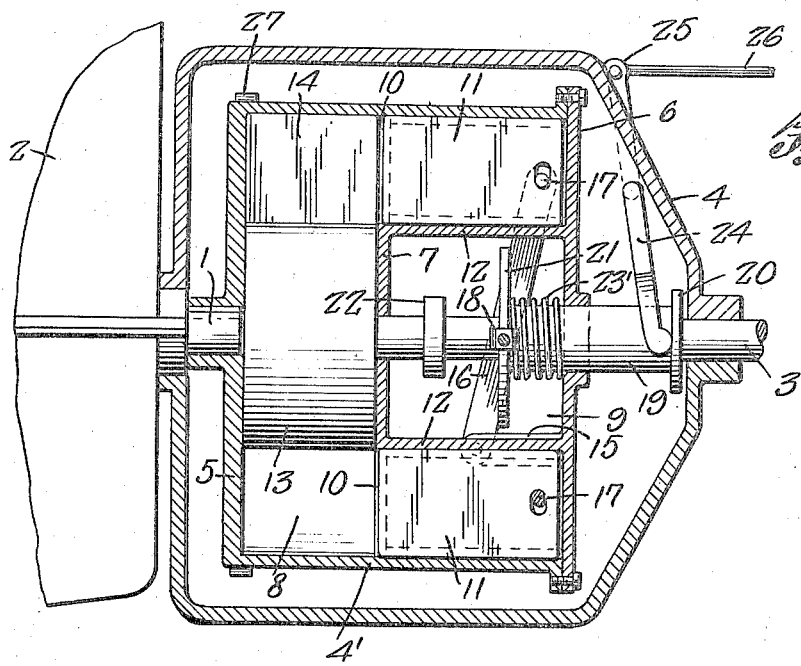
Figure 1 is a vertical sectional view illustrating a transmission constructed in accordance with my invention and showing the same connecting drive and driven shafts, the drive shaft in this instance being the crank shaft of an engine and the driven shaft, the propeller shaft of an automobile.
Figure 5:
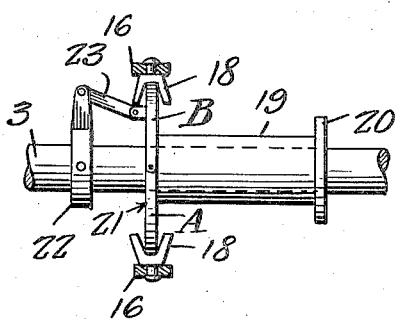
Figure 5 is a fragmentary side elevation, partly in section, showing the means of operating the gate type valves.
Figure 6:
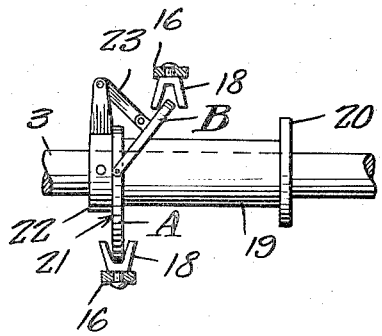
Figure 6 is a view similar to Figure 5 showing the operating means occupying the position assumed when bringing about direct drive between the shafts.

Referring in detail to the drawings, the numeral 1 indicates a drive shaft which in this instance is the crank shaft of an engine 2. The driven shaft is indicated by the character 3 and may be the propeller shaft of an automobile. The driven shaft is supported by a housing 4 and the latter is suitably mounted on the engine 2. Secured on the drive shaft is a cylinder 4', one end of which is closed by an integral wall 5 and is secured axially on the drive shaft 1.

The other end of the cylinder 4' is closed by a removable end wall 6 acting as a journal for the driven shaft 3. A radial partition 7 divides the cylinder into a main chamber 8 and an auxiliary chamber 9. The partition 7 has slots 10 through which operate gate type valves 11. Gates 12 are carried by the cylinder 4' to slidably support the gate type valves 11 and arrange them in alignment with the slots in the partition of the cylinder. The driven shaft 3 extends into the main chamber 8 and has secured thereon a hub 13 carrying a blade 14. The blade 14 has wiping contact with the walls of the cylinder. It is to be understood that the cylinder 4' is filled with a suitable liquid.

Brackets 15 are carried by the end walls 6 and pivotally support arms 16. The arms are connected to the gate type valves 11 by pin and slot connections 17 and also have connected thereto forks 18. A sleeve 19 is splined on the driven shaft 3 and slides through the end wall 6 of the cylinder 4' and is equipped at one end with a flange 20 and at its opposite end with a flange 21. The flange 21 includes a rigid portion A and a hinged portion B. The hinged portion is connected to a collar 22 fixed on the driven shaft by a link 23. A coil spring 23' is mounted on the sleeve 19 between the wall 6 of the cylinder and the flange 21 and acts to urge the sleeve in a direction to bring the gate type valves in operative position for establishing a drive between the drive and driven shafts. A fork 24 is pivoted in the housing 4 and engages the collar 22 of the sleeve 19 and is equipped with an arm 25 on its pivoted end. The arm 25 is connected to a suitable control such as a pedal or a lever (not shown) through the use of a link 26.

When the sleeve 19 is in the position as shown in Figure 1 and held in this position through the manual actuation of the operating medium (not shown) the gate type valves are drawn into the auxiliary compartments. The gate type valves when in the auxiliary compartments permit the drive shaft to rotate free of the driven shaft, consequently providing between the drive and driven shafts a declutching of said shafts. When the sleeve 19 is in the latter-named position or as shown in Figure 1, the portion B lies in the same plane as the portion A allowing the forks of the arms 16 to slide freely about the flange 21 during the rotation of the cylinder 4' with the drive shaft relative to the driven shaft and without causing reciprocation of the axial movable valves 11.

When the operating medium is manually released the spring moves the sleeve 19 into the position shown in Figure 2 causing the portion B to move angularly with respect to the portion A and one of the forks being in engagement with the portion A causes the gate valve of said fork to move into the path of the blade 14 trapping liquid between said blade 14 and the respective gate valve thereby establishing a direct drive between the drive and driven shafts. The other gate valve remains in the auxiliary chamber due to its fork being in engagement with the portion B. When the valves are thus positioned the one extending out of the auxiliary chamber will effect rotation of the shaft 3 and sleeve 19 due to the pressure of liquid thereon by the blade 14 and continued rotation of the sleeve 19, through the medium of the portions A and B, serves to alternately move the valves 11 into and out of the auxiliary chamber. By adjusting the sleeve 19 relative to the collar 22 as heretofore described, the distance the valves 11 move into the main chamber may be controlled thereby varying the speed of the shaft 3 relative to the shaft 1.

To provide a variable drive between the drive and driven shafts, the operator permits the sleeve 19 to gradually move in the direction of the position shown in Figure 2 and by so doing the gate type valve will be caused to move into and out of the main compartment in an alternating manner bringing about a partial trapping of the fluid or liquid between said valves and the blade 14. This partial trapping of the fluid or liquid permits the drive shaft to drive the driven shaft at a slower rate of speed than the speed of operation of the drive shaft. The alternating movement of the gate type valve is brought about by the flange 21 rotating within the forks and with the portion B thereof disposed angularly to the portion A. As heretofore set forth, the sleeve 19 is slidably mounted on the shaft 3 and rotatable therewith and when said sleeve is actuated in a direction towards the collar 22, the portion B of the flange 21 is pivoted towards the wall 6 whereby upon rotation of the sleeve the portion B will alternately engage the forks 18 to cause alternate axial movement of the valves 11. This alternating movement of the gate type valves into and out of the main compartment during the variable drive between the drive and driven shafts is necessary due to the gate type valves rotating faster than the speed of rotation of the blade 14 and vice versa.

The cylinder 4' may act as a fly wheel for the engine 2 and has secured thereon a starter gear 27. The cylinder may have a removable plug 28 to permit filling of said cylinder with liquid.

What is claimed is:

1. A transmission comprising a cylinder secured on a drive shaft and receiving freely therein a driven shaft, means dividing said cylinder into main and auxiliary chambers and including slots for gate type valves, means for slidably supporting gate type valves in said auxiliary chamber for movement into the main chamber by way of said slots, a blade secured on the driven shaft and having wiping contact with the cylinder within the main chamber, and an operating means connected to said valves for movement of the valves into and out of the main chamber for establishing a direct drive between said shafts and for providing a variable drive between the drive shaft and the driven shaft and for disconnecting said shafts.

2. A transmission comprising a cylinder secured on a drive shaft and receiving freely therein a driven shaft, means dividing said cylinder into main and auxiliary chambers and including slots for gate type valves, means for slidably supporting gate type valves in said auxiliary chamber for movement into the main chamber by way of said slots, a blade secured on the driven shaft and having wiping contact with the cylinder within the main chamber, an operating sleeve slidably secured on the driven shaft, an operating means connected with said sleeve, a spring acting on said sleeve to urge the same in one direction, and means for connecting said sleeve to said valves.

3. A transmission comprising a cylinder secured on a drive shaft and receiving freely therein a driven shaft, means dividing said cylinder into main and auxiliary chambers and including slots for gate type valves, means for slidably supporting gate type valves in said auxiliary chamber for movement into the main chamber by way of said slots, a blade secured on the driven shaft and having wiping contact with the cylinder within the main chamber, an operating sleeve slidably secured on the driven shaft, an operating means connected with said sleeve, a spring acting on said sleeve to urge the same in one direction, a flange formed on said sleeve and including a relatively fixed portion and a hinged portion, means secured on said shaft and connected to said movable portion to bring variance in the position of the movable portion relative to the fixed portion in accordance to the position assumed by said sleeve, and means connecting said flange to said valves.

4. A transmission comprising a cylinder secured on a drive shaft and receiving freely therein a driven shaft, means dividing said cylinder into main and auxiliary chambers and including slots for gate type valves, means for slidably supporting gate type valves in said auxiliary chamber for movement into the main chamber by way of said slots, a blade secured on the driven shaft and having wiping contact with the cylinder within the main chamber, an operating sleeve slidably secured on the driven shaft, an operating means connected with said sleeve, a spring acting on said sleeve to urge the same in one direction, a flange formed on said sleeve and including a relatively fixed portion and a hinged portion, means secured on said shaft and connected to said movable portion to bring about variance in the position of the movable portion relative to the fixed portion in accordance to the position assumed by said sleeve, arms pivotally mounted in the cylinder and having pivotal and slidable connection with said valves, and forks pivoted on said arms and engaging said flange.

LAWRENCE WESLEY CHILTON.